Oct. 9, 1951  R. C. DEHMEL  2,570,776
SHAFT COUPLING

Original Filed Oct. 2, 1947  2 Sheets-Sheet 1

INVENTOR.
Richard C. Dehmel
by Orin R. Swern
his ATTORNEY.

Oct. 9, 1951　　　R. C. DEHMEL　　　2,570,776
SHAFT COUPLING
Original Filed Oct. 2, 1947　　　2 Sheets-Sheet 2

INVENTOR.
RICHARD C. DEHMEL
BY
Orin R. Severn
his ATTORNEY.

Patented Oct. 9, 1951

2,570,776

UNITED STATES PATENT OFFICE 2,570,776

SHAFT COUPLING

Richard C. Dehmel, Short Hills, N. Y.

Original application October 2, 1947, Serial No. 777,414. Divided and this application July 16, 1949, Serial No. 105,163

5 Claims. (Cl. 64—10)

This invention relates to shaft couplings and particularly to shaft couplings for small interconnected units involving limited torque that are necessarily closely spaced and that must operate from the drive element without back-lash or material variation in relative angular position.

This application is a division of my application, Serial No. 777,414, filed October 2, 1947, for "Flight Computing System and Apparatus" (166–D).

A principal object of the present invention is to provide an improved, compact, simple and inexpensive shaft coupling that is capable of transmitting smoothly and precisely rotary motion in either direction through a plurality of closely groups interconnected units.

In accordance with the present invention, a pair of shafts disposed in general alignment is coupled by means of a resilient pin and slot connection mounted at adjacent ends of the shafts. The connection is made free of backlash by means of spring bias so that smooth angular transmission is obtained from the drive shaft notwithstanding reversal of rotation of the drive shaft and material misalignment of the drive and driven shafts. The connection occupies a very small space as compared with the conventional universal coupling so that the coupled shafts may be in practically abutting relation if desired.

The invention will be more fully set forth in the following description referring to the accompanying drawings, and the features of novelty will be pointed out with particularity in the claims annexed to and forming a part of this specification.

Referring to the drawings.

Figure 1:
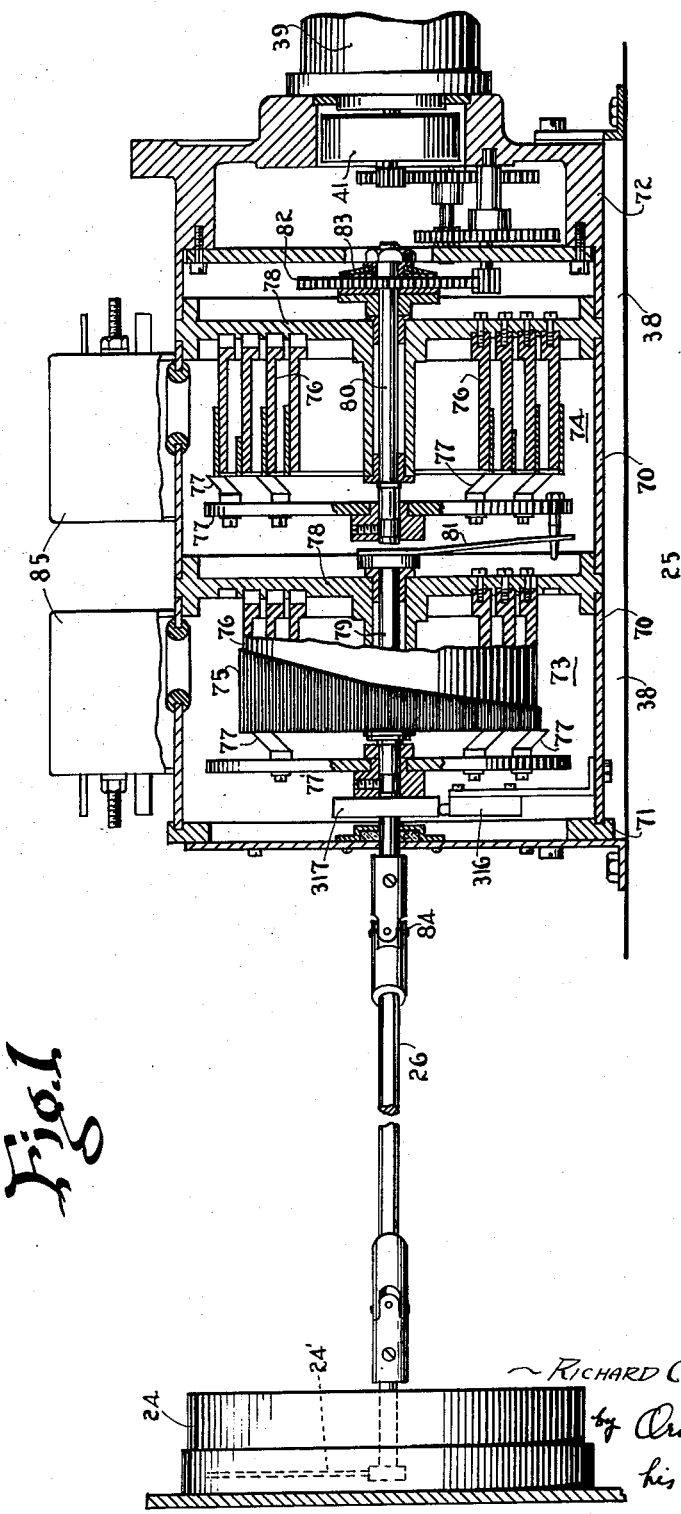
Fig. 1 is a view, partly in cross-section, of servo and potentiometer units having a coupling embodying the present invention shown in connection with a simulated flight instrument.

In a practical embodiment of the invention shown in Fig. 1, a plurality of potentiometer units 73 and 74 such as those in servo computing apparatus for use in a flight simulating system of the character disclosed in my aforesaid application, Serial No. 777,414, are mechanically coupled so as to transmit angular motion from a driving servo motor 39, through the potentiometer units, to a simulated flight indicating instrument 24. The torque involved in the operation of such apparatus is comparatively small but it is essential that the reversible servo motor transmit accurately and faithfully within fine limits angular movement to the potentiometer units, which are in effect electrical precision instruments, and to the flight simulating instrument. The potentiometers control various computing circuits, a description of which is unnecessary for an understanding of the present invention.

A structural arrangement that may be conveniently used for a servo motor and potentiometer combination of the character above referred to comprises a unit 25 having a pair of cylindrical housing sections 70 suitably secured together by end sections 71 and 72 and enclosing two groups of potentiometers generally indicated at 73 and 74 respectively. The potentiometer resistance elements such as 75 are wrapped on cylindrical insulating members 76 which vary in diameter so that they can be nested in concentric relation on the mounting plates 78 about the centrally located shaft sections 79 and 80. These shaft sections carry insulating supports 77' for the coacting potentiometer slider contacts 77. The mounting plates 78, which also form partitions in the housing serve as bearing supports for the contact carrying shafts 79 and 80 respectively, the shaft sections being coupled by a self-aligning connection 81 embodying the present invention for assuring comparatively accurate follow-up movement of the shaft 79.

The end section 72 supports a small motor-generator set, the motor 39 being indicated, connected to a flywheel 41 and reduction gear train 42 for positioning the potentiometer contacts 77. The driving connection between the drive gear 82 of the gear train and the contact operating shaft 80 includes a simple friction clutch 83 of the spring washer type arranged to permit motor over-travel as well as manual adjustment of the potentiometer contacts independently of the motor and gear train mechanism. The driven shaft section 79 extends through the end wall 71 and is provided with a universal coupling 84 that is connected to the rod 26 for operating the pointer 24' of a simulated air speed meter 24.

Figure 2:
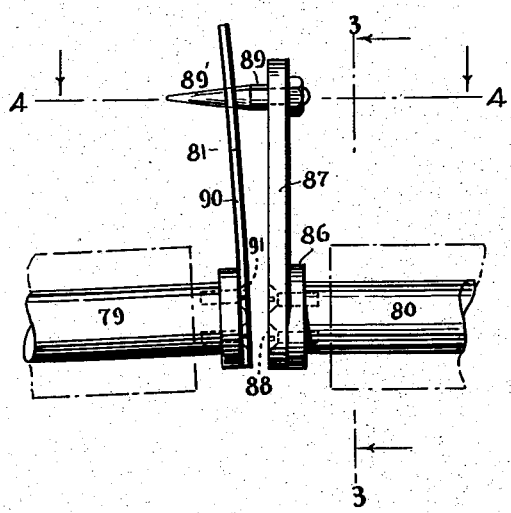
Fig. 2 is an enlarged side view of the shaft coupling illustrated in Fig. 1.
Figure 3:
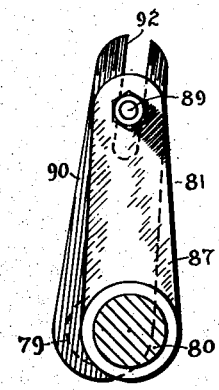
Fig. 3 is a sectional view taken along the line 3—3 of Fig. 2.
Figure 4:
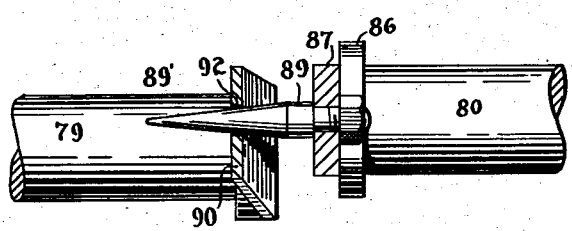
Fig. 4 is a sectional view somewhat enlarged taken along the line 4—4 of Fig. 2.

The self-aligning connection 81 for the potentiometer shafts 79 and 80 is shown in detail by Figs. 2 to 4, misalignment of the shafts being exaggerated for purposes of illustration. Although universal couplings are well known, it often happens that the shafts to be coupled are so closely spaced, due to requirements for very compact equipment, that conventional couplings cannot conveniently be used. The present coupling can be used in cases where the adjoining shafts practically touch each other, as in compactly arranged potentiometer groups for electric computing apparatus so as positively to connect the shafts without back-lash. Furthermore accidental slight relative longitudinal displacements of the shafts are automatically compensated without interfering with the proper transmission of movement.

Referring to Fig. 2, the drive shaft section 80 is provided at its free end 86 with an offset arm 87 rigidly secured at 88 to the butt end of the shaft. The outer end of the arm carries an offset tapered pin-like member 89 extending toward the driven shaft 79 substantially parallel to the shaft lineup. The driven shaft 79 is also provided with an offset element, in this case a leaf spring or the like 90 secured at 91 to the adjoining butt end of the shaft 79. The leaf spring 90 is normally biased toward the arm 87 and is bifurcated at its outer free end to form a narrow slot 92, Figs. 3 and 4, in which the tapered end 89' of the pin rides as the spring follows up any inequalities of movement between the parts 87 and 90. Accordingly the tapered portion of the pin biased by its resilient mounting into continuous seating engagement with the complementary slotted portion precludes any "play" between the driving and driven parts. The slotted portion also permits limited relative radial movement of the pin in case of shaft misalignment. The preferred arrangement of the parts is illustrated although it will be understood of course that either arm may be resilient for the purpose described. Thus, the leaf spring and pin combination constitutes a resilient pin and slot connection for not only transmitting smooth angular movement to the driven shaft 79, but also eliminating back-lash or other objectionable relative movement between the shafts.

It will therefore be apparent that operation of the motor 39 in either direction causes both a corresponding change in the instrument reading and movement of the potentiometer contacts to different precise angular positions on the respective potentiometer elements for deriving, i. e., picking off, potentiometer voltages corresponding to the contact position. The electrical connections for the terminals of each potentiometer and its associated contact are omitted in the interest of clearness.

It should be understood that this invention is not limited to specific details of construction and arrangement thereof herein illustrated, and that changes and modifications may occur to one skilled in the art without departing from the spirit of the invention.

What is claimed is:

1. A coupling for two shafts that are closely spaced end-to-end comprising an arm connected to one of said shafts in offset relation thereto, said arm having a slotted portion at its free end, a second arm connected in offset relation to the adjacent end of the other shaft, and a tapered member connected to said second arm for engaging said slotted portion so as to mechanically couple said shafts, one of said arms being resiliently biased so that said member and slotted portion are urged into continuous engagement with each other at the tapered surface of said member so as to insure smooth angular drive notwithstanding limited misalignment of said shafts and to preclude back-lash between said shafts.

2. A coupling for two shafts disposed in near abutting end-to-end relation comprising an arm connected to one of said shafts in offset relation thereto, said arm having a slotted portion at its free end, a second arm connected in offset relation to the adjacent end of the other shaft, and a tapered pin connected to said second arm for engaging said slotted portion so as to mechanically couple said shafts, one of said arms comprising a leaf spring that is biased so as to urge said pin and slotted portion into continuous engagement at the tapered surface of said pin so as to insure smooth angular drive notwithstanding limited misalignment of said shafts and to preclude back-lash between said shafts.

3. A coupling for two closely spaced shafts positioned end-to-end comprising a resilient arm connected to one of said shafts in offset relation thereto, said arm having a slotted portion at its free end, a second arm connected in offset relation to the adjacent end of the other shaft, and a tapered pin connected to said second arm for engaging said slotted portion so as mechanically to couple said shafts, said resilient arm being biased into continuous engagement with said pin at its tapered surface so as to insure smooth angular drive notwithstanding limited misalignment of said shafts and to preclude back-lash between said shafts.

4. In servo apparatus having a plurality of closely grouped driven units with generally aligned operating shafts in near abutting relation, coupling means between said shafts for maintaining the same in substantially angular agreement notwithstanding limited misalignment thereof comprising a resilient member connected to one of said shafts in offset relation thereto and having a slotted portion at its free end, and a pin element mounted on the adjacent end of the coupled shaft also in offset relation and arranged to engage said slotted portion, said resilient member being biased into following engagement with said pin so as to preclude back-lash between said shafts.

5. In servo apparatus having a plurality of closely grouped driven units with generally aligned operating shafts in near abutting relation, coupling means between said shafts for maintaining the same in substantially angular agreement notwithstanding limited misalignment thereof comprising a leaf spring member connected to one of said shafts in right angle relation thereto and having a slotted portion at its free end, and a tapered pin secured to the adjacent end of the coupled shaft also in right angle relation and arranged to fit within the slot in said spring member, said spring member being biased into following engagement with said pin at its tapered surface so as to preclude back-lash between said shafts.

RICHARD C. DEHMEL.

REFERENCES CITED

The following references are of record in the file of this patent:

FOREIGN PATENTS

| Number | Country | Date |
|---|---|---|
| 56,245 | Netherlands | 1944 |